United States Patent
Clark et al.

(10) Patent No.: US 11,242,267 B1
(45) Date of Patent: Feb. 8, 2022

(54) FLUID TREATMENT APPARATUS

(71) Applicant: MSL Oilfield Services Ltd, Poole (GB)

(72) Inventors: Martin Clark, Poole (GB); Jonathan Kidd, Poole (GB)

(73) Assignee: MSL OILFIELD SERVICES LTD, Poole (GB)

( * ) Notice: Subject to any disclaimer, the term of this patent is extended or adjusted under 35 U.S.C. 154(b) by 0 days.

(21) Appl. No.: 17/232,096

(22) Filed: Apr. 15, 2021

(30) Foreign Application Priority Data

Apr. 8, 2021 (GB) ..................................... 2105017

(51) Int. Cl.
*C02F 1/48* (2006.01)
*H01F 7/06* (2006.01)
*C02F 5/00* (2006.01)

(52) U.S. Cl.
CPC .............. *C02F 1/485* (2013.01); *C02F 1/487* (2013.01); *C02F 5/00* (2013.01); *H01F 7/064* (2013.01); *C02F 2201/483* (2013.01); *C02F 2303/20* (2013.01); *C02F 2303/22* (2013.01)

(58) Field of Classification Search
None
See application file for complete search history.

(56) References Cited

U.S. PATENT DOCUMENTS

| | | | |
|---|---|---|---|
| 3,263,182 A | 7/1966 | Opolski et al. | |
| 4,938,875 A * | 7/1990 | Niessen | C02F 1/487 210/222 |
| 5,649,507 A | 7/1997 | Gregoire et al. | |
| 5,935,433 A | 8/1999 | Stefanini | |
| 6,706,170 B1 * | 3/2004 | Doelman | C02F 1/487 210/85 |
| 7,361,255 B1 | 4/2008 | Kuhry | |
| 7,378,063 B1 | 5/2008 | Wyles | |
| 9,181,113 B2 | 11/2015 | Clark et al. | |
| 9,624,118 B2 | 4/2017 | Clark | |
| 10,023,482 B2 | 7/2018 | Clark | |
| 2002/0179536 A1 * | 12/2002 | Lee | C02F 1/48 210/695 |
| 2003/0222664 A1 | 12/2003 | van de Goor et al. | |

(Continued)

FOREIGN PATENT DOCUMENTS

CN 2217618 Y 1/1996
WO 2004014512 A2 2/2004

OTHER PUBLICATIONS

"Supplementary European Search Report," received in EP Application No. 12749907, completed Aug. 21, 2014 (2 pages).

*Primary Examiner* — David C Mellon
(74) *Attorney, Agent, or Firm* — Tillman Wright, PLLC; James D. Wright; David R. Higgins

(57) ABSTRACT

A fluid treatment apparatus includes a ferrite assembly, a driver, and an oscillator circuit. The ferrite assembly is arranged in use to be capable of surrounding a conduit containing fluid to be acted on. The driver is arranged to generate a pulsed current to which the ferrite assembly is subjected whereby the driver is electromagnetically coupled to the ferrite assembly. The oscillator circuit is electromagnetically coupled to the ferrite assembly, and in response to the pulse generated by the driver, causes an oscillating signal to be generated which gives rise to an electromagnetic field which acts on the fluid in the conduit.

13 Claims, 4 Drawing Sheets

(56) References Cited

U.S. PATENT DOCUMENTS

| | | |
|---|---|---|
| 2005/0145509 A1 | 7/2005 | Sams |
| 2007/0095739 A1* | 5/2007 | Ebihara .................... H01F 3/00 |
| | | 210/222 |
| 2009/0236294 A1 | 9/2009 | Wittmer et al. |
| 2012/0217815 A1 | 8/2012 | Clark |
| 2016/0023926 A1 | 1/2016 | Clark |
| 2017/0101327 A1* | 4/2017 | Suvorov .................... C02F 5/02 |
| 2017/0217801 A1 | 8/2017 | Clark |

* cited by examiner

FLUID TREATMENT APPARATUS

CROSS REFERENCE TO RELATED APPLICATIONS

This application claims the benefit of United Kingdom Patent Application No. GB 2105017.4, filed Apr. 8, 2021, which application and any publication thereof are incorporated by reference herein.

TECHNICAL FIELD

The present invention relates to improvements relating to resisting the formation and build-up of scale deposits and/or the proliferation of bacteria, in fluid-containing systems.

BACKGROUND

The present invention generally relates to an apparatus for treating a fluid-containing system in order to resist the formation and build-up of scale deposits, and/or the proliferation of bacteria, in fluid-containing systems.

Scale includes the build-up of mineral salt deposits on internal surfaces of fluid-containing equipment, including by way of crystalline growth, such as can occur in fluid carrying pipes. In particular, calcium and magnesium, which are commonly contained in water, are heavily involved in the formation of scale.

Scale is formed when mineral ions present in a fluid reach conditions at which they change phases from liquid to solid. Ions present in a fluid require energy to begin the process of forming a solid. Formation of a solid on an existing surface, such as the internal surface of a pipe, requires less energy. Accordingly, it is on the surfaces of pipes and other equipment with which the fluid comes into contact that mineral ions most frequently undergo their phase change to solids. The solids form on, and adhere to, these surfaces, creating scale.

When scale builds up in a pipe or other conduit, it alters the flow of the fluid through it. By decreasing the volume of fluid that flows through a pipe, scale requires pumps and other industrial equipment to use more energy in order to transport the same volumetric rate of transport of fluid. Scale may also increase pressure in a pipe, which can cause leaks and breakages. Because heat provides energy to fuel the ions' phase change to solid, scale build-up on heated equipment, such as steam boilers and heat exchangers, is especially problematic. Scale formation on these devices may lead to reduced heat transmission, higher fuel usage, and even local overheating and failure. The build-up of scale also may have a number of indirect effects, such as providing a location for bacteria to build up in the fluid-containing system and interacting with soap to prevent cleaning of the fluid-containing system.

A number of methods to resist scale formation and build-up are known in the art. For instance, chemical solutions have been introduced into fluid-containing systems. The use of chemical solutions, however, is undesirable both because it requires constant replenishment and because it contaminates the fluid. Accordingly, a number of physical water treatment methods have been identified. One physical water treatment method involves positioning electrodes in the fluid-containing system. However, as the electrodes erode, they lose their effectiveness and need to be replaced. Another method involves the positioning of magnets in direct contact with the fluid. However, the magnets collect magnetic debris which, itself, can obstruct the pipe.

Additionally or alternatively to scale build-up, bacterial growth may occur in a fluid containing system.

We have devised a novel apparatus for resisting/preventing the formation and build-up of scale deposits and for resisting/preventing, bacterial growth in fluid-containing systems.

SUMMARY

According to the invention there is provided a fluid treatment apparatus.

According to an embodiment of the invention there is provided a fluid treatment apparatus, the apparatus comprising:
a ferrite assembly, arranged in use to be capable of surrounding a conduit containing fluid to be acted on,
a driver, arranged to generate a pulsed current to be introduced into the ferrite assembly, the driver coupled to the ferrite assembly, and
an oscillator circuit comprising a capacitor, which oscillator circuit is coupled to the ferrite assembly.

The driver may be coupled to the ferrite assembly by way of at least one turn of winding around the ferrite assembly. The winding may comprise an electrical conductor.

The duration of the pulse may be between 0.75 μs and 3.75 μs. The duration of the pulse may be between 1 μs and 3 μs. The duration of the pulse may be between 1.5 μs and 2.5 μs. The duration of the pulse may be between 1.75 μs and 2.25 μs. The duration of the pulse may be substantially 2 μs.

The oscillator circuit may be coupled to the ferrite assembly by way of multiple turns of winding around the ferrite assembly.

The oscillator circuit may be a passive circuit.

The oscillator circuit may be termed a resonator.

The oscillator circuit may be arranged to generate a decaying oscillating signal.

The oscillator circuit may comprise a capacitor. The capacitor may be of fixed capacitance or variable capacitance.

The driver may be arranged to produce a (subsequent) pulse when the decaying oscillating signal has fully or substantially fully decayed or dissipated.

Both the driver and the oscillator circuit may be coupled to the ferrite assembly electromagnetically, and may be coupled by magnetic induction.

The driver may be connected to the ferrite assembly way of a conductor arranged around the ferrite assembly.

The driver may comprise at least one of a transistor switch, a power amplifier or an operational amplifier.

The ferrite assembly may be arranged to adopt a detached condition and a connected condition. In the detached condition, at least two end regions of the ferrite assembly are detached and separable from each other, and in the connected condition the at least two end regions are connected together. The at least two end regions of the ferrite assembly may be detachably connectable.

The ferrite assembly may be termed a (magnetic) core.

When in the connected condition the at least two ends may be adjacent to one another, and may be touching or in face-to-face contact, or held in very close proximity. When in the connected condition there may be a gap between the at least two end regions.

When the ferrite assembly is in the connected condition, the at least two end regions are arranged such as to form an interface which ensures electromagnetic continuity.

In the connected condition the ferrite assembly may form a closed loop or ring. In the complete condition, the ferrite assembly may be termed a ferrite ring. The two parts which form the lop/ring may be substantially semi-circular.

In the connected condition, the ferrite assembly may define an internal space through which the conduit is able to pass.

The ferrite assembly in the detached condition may be arranged to be placed around a fluid-containing conduit.

In use, the apparatus may be arranged to generate an induced voltage in the fluid in the conduit. In use, the apparatus may be viewed as causing an electromagnetic field to be generated in the conduit. In use, the apparatus may be arranged to cause Lorentz forces to act on the fluid in the conduit.

The ferrite assembly may comprise a fastener arrangement to maintain the at least two ends secured together in the connected condition.

In the case of the ferrite assembly comprising two detachably connectable end regions, the ferrite assembly may comprise a hinge. The hinge may be arranged to pivot one part of the ferrite assembly from another, to and from a complete condition to a detached condition, and vice versa.

The ferrite assembly may be viewed as comprising two major constituent parts. Each part may be considered as a sub-assembly of the ferrite assembly. When in the connected condition, the two component parts may form a single rigid entity.

In the case that the ferrite assembly having four detachably connectable end regions, it may be (fully) separable into two component parts.

In the case of the ferrite assembly comprising two (fully) separable parts, the device may comprise a housing which is arranged to receive said two parts, at least one of which is detachable from said housing. When both parts are located in the housing, they may be in the connected condition.

The housing may comprise a channel arranged to receive and locate the ferrite parts. An aspect of the invention may be viewed as an apparatus for protecting a fluid-containing system from scale deposits and/or from bacterial growth.

Another aspect of the invention is a method of resisting and/or preventing a fluid-containing system from scale deposits and/or bacterial growth wherein the method comprises installing the apparatus of the first aspect of the invention to a fluid-containing conduit.

The invention may additionally comprise one or more features as described in the detailed description and/or as shown in the drawings, either individually or in combination.

BRIEF DESCRIPTION OF THE DRAWINGS

Various embodiments of the invention are described below, which are given by way of example only, in which.

DETAILED DESCRIPTION

Figure 1:
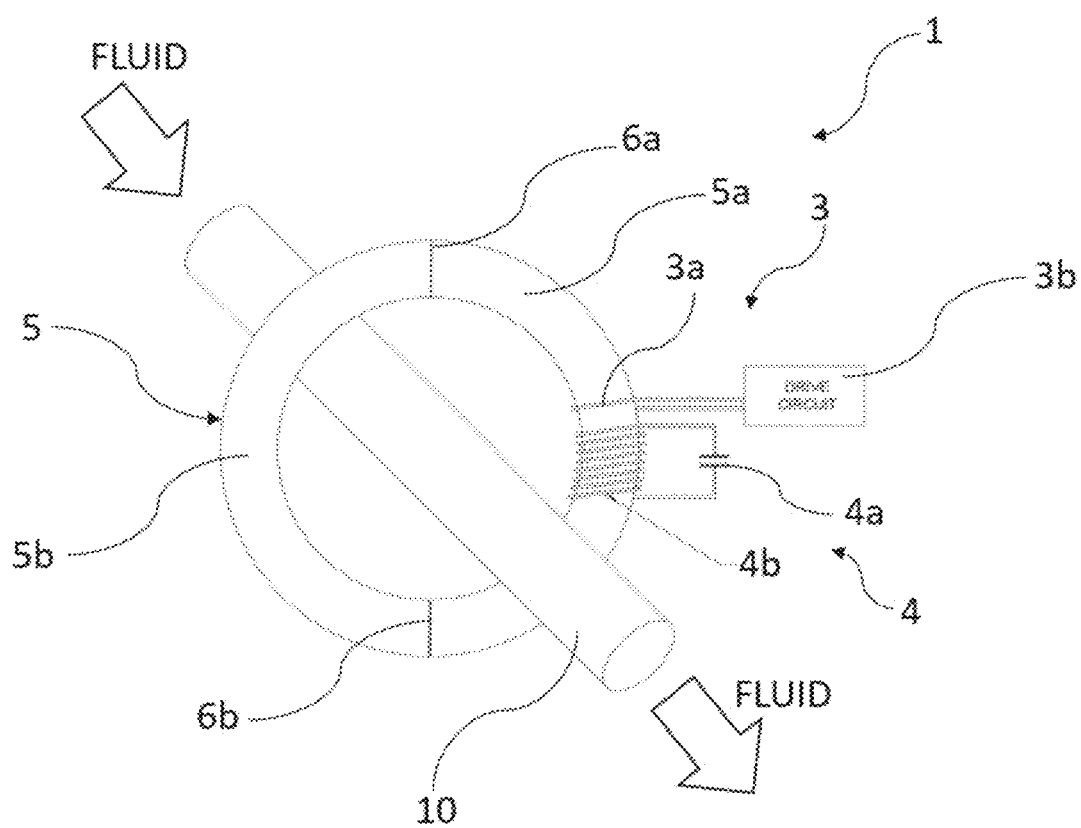
FIG. 1 is a schematic view of embodiment of an apparatus for resisting the formation and build-up of scale deposits.

There is now described a novel apparatus 1 for resisting the formation and build-up of scale deposits and/or the proliferation of bacteria in fluid-containing systems. In overview, the apparatus 1 comprises a driver assembly 3, a resonator circuit 4 and a ferrite ring 5.

The driver assembly 3 comprises circuitry 3h which is connected to a coil 3a which is wound around a portion of the ferrite ring 5. The circuitry is arranged to generate a pulsed current. The driver assembly may be implemented by way of a transistor switch, power amplifier or operational amplifier. Functionality is not affected, or at least may not be to any significant or meaningful extent, by the spacing between circuitry 3b and coil 3a, and so these sub-assemblies could be further apart or closer together than shown, whilst maintaining functionality.

The ferrite ring 5 comprises two major constituent components, referenced in Figure as 5a and 5h. The ferrite ring 5 in FIG. 1 is shown in a connected condition in which the two end faces of component 5a are held in face-to-face contact with two opposed end faces of the component Sb. The components 5a and Sb are held in the connected condition by way of a fastener (not shown). The pairs of opposed end faces form two interfaces 6a and 6h. The fastener(s) may comprise a clamp or a pin, or similar, and ensures that electromagnetic continuity between the two components 6a and 6b is maintained whilst in the connected condition.

The resonator circuit 4, comprises a capacitor 4a. The capacitor 4a is connected to winding 4b multiple turns which are arranged around the component 5a of the ferrite ring. The resonator winding 4b is electrically isolated with no other connections being made to it including ground. The capacitor 4a although shown as being of fixed capacitance may be of variable capacitance and in the case of the latter so enabling tuning to best suit system requirements).

The ferrite ring 5 defines a central aperture, through which a conduit 10 passes. The conduit 10 is a fluid-containing conduit.

In use, when the two halves 5a and 5b of the ferrite ring 5 are joined together this achieves a tight connection so as to minimize any air gap between the opposed pairs of end faces as much as possible. In this way, any detrimental effect of the joint is minimized, and the magnetic properties should be similar to an equivalent continuous unitary ring with no mechanical joints. However, it is not essential for the effective operation of the device that there is no or only a minimal air gap.

The ferrite 5 behaves like a toroidal transformer with the pipe forming a signal turn secondary winding. If the pipe contains a conductive fluid, then a voltage is induced across the ends of the pipe by the transformer action. This voltage will be of the same magnitude as that obtained from a single turn of copper wire when measured with a high impedance instrument.

Oscillation is triggered in the ferrite ring 5 by introducing a 2 μs current trigger pulse to the winding 3a, which is essentially a single turn primary winding. The current pulse is generated by the driver 3b. The effect of this is to ramp up the magnetic flux in the ferrite ring 5 from its initial value. This change in magnetic flux causes a step voltage to be induced the winding 4h of the resonator circuitry 4 which then charges the capacitor 4a connected across its ends. When the trigger pulse terminates, the capacitor 4a then discharges through the resonator winding 4a and the inductance of this winding attempts to maintain this current flow after the capacitor is discharged, thereby charging the capacitor 4a in the opposite polarity. When the current in resonator winding 4b current drops to zero, the capacitor 4a begins to discharge again in the opposite direction. This cycle continues several times after the trigger pulse has ceased until all the energy has been dissipated. The magnetic flux produced by current flow in the resonator winding 4b is sinusoidal in nature and decays in amplitude over time as energy is lost. This oscillating magnetic flux induces a voltage across the end regions of the conduit 10. This is turn causes an electromagnetic field and voltage to be generated in the fluid in the conduit 10 which inhibits the build-up of scale and bacterial growth. In particular, the electromagnetic field (EMF) brought about in the system by the device, exerts Lorentz forces on the charged moving ions in the fluid. The EMF effect on divalent ions is much greater than on the monovalent and anions. The effect of the EMF on divalent ions is to alter the hydration energy of the ion, i.e. it affects the magnetic orientation of the proton spin. This actually accelerates homogeneous nucleation and prevents further crystal growth.

The presence of a rapidly variable electromagnetic signal and its associated induced voltage removes biofilm and prevents its formation on an inner surface of the conduit. It also immobilises the bacteria within the fluid causing damage to the cell walls and eventually death.

It will be appreciated that (electromagnetic) coupling between the resonator, trigger winding, and pipe is entirely due to magnetic induction.

Figure 2:
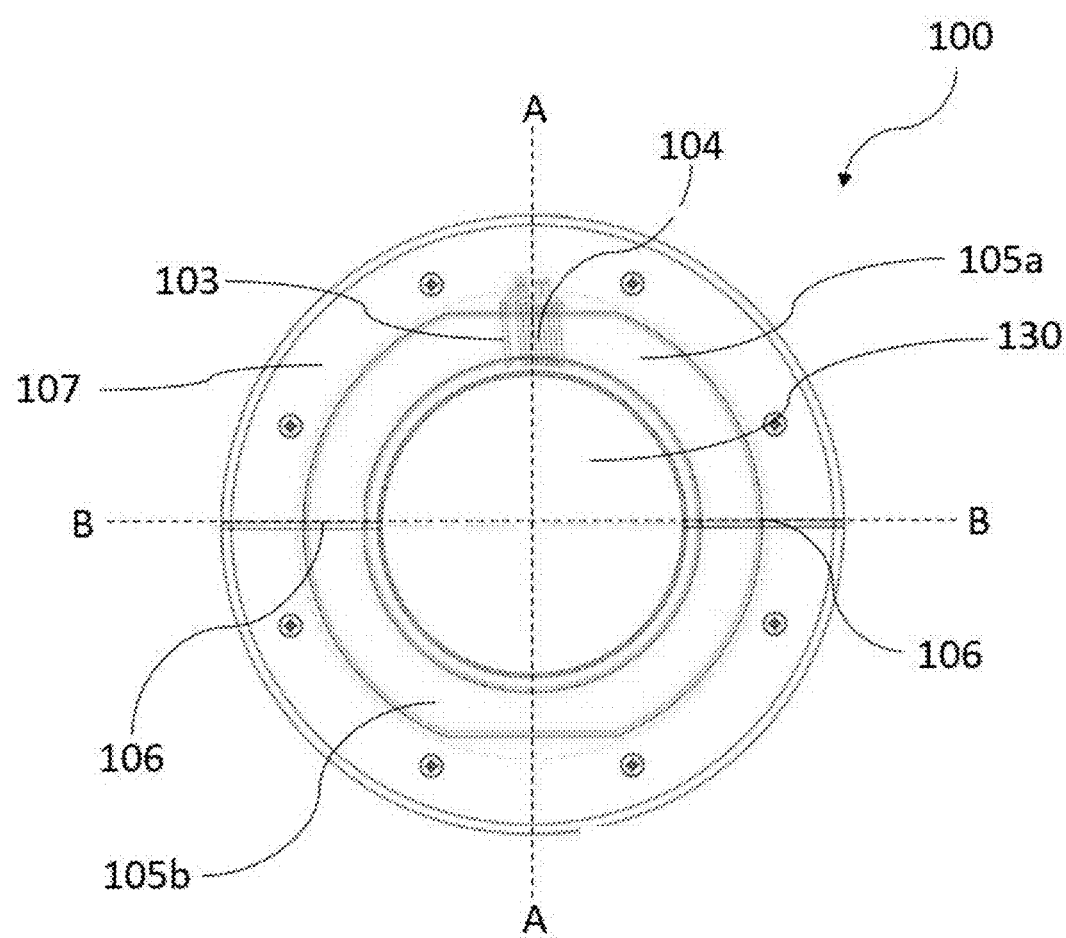
FIG. 2 is a plan view of a second embodiment of a fluid treatment apparatus.
Figure 3:
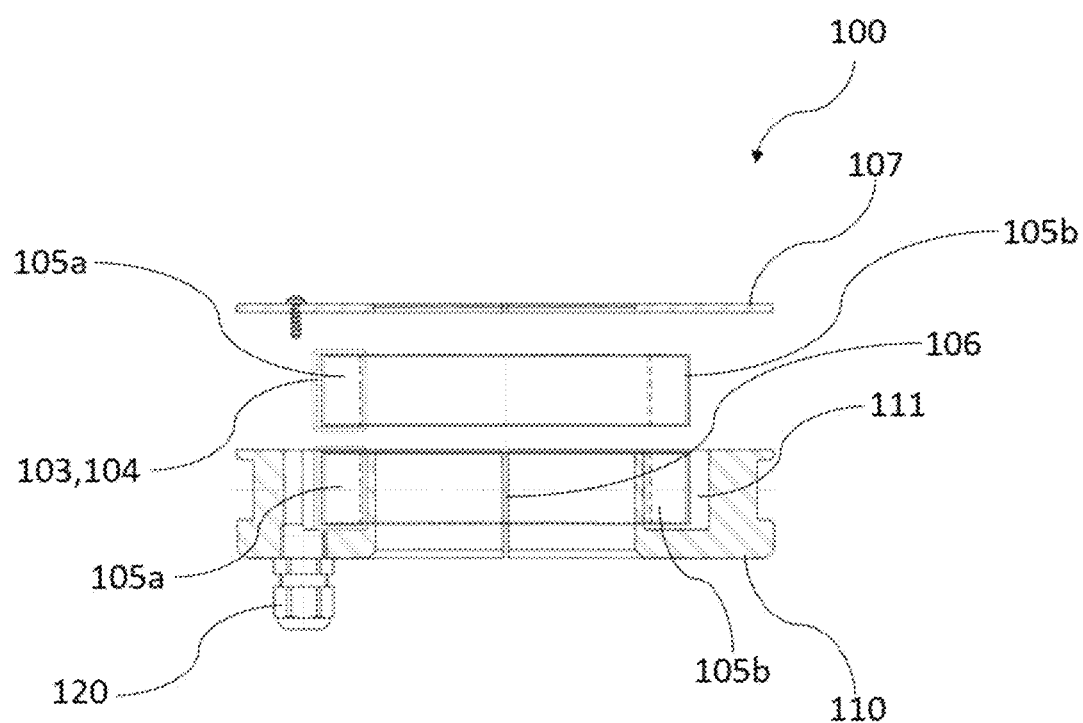
FIG. 3 is an elevation on section A-A of the apparatus shown in FIG. 2.
Figure 4:
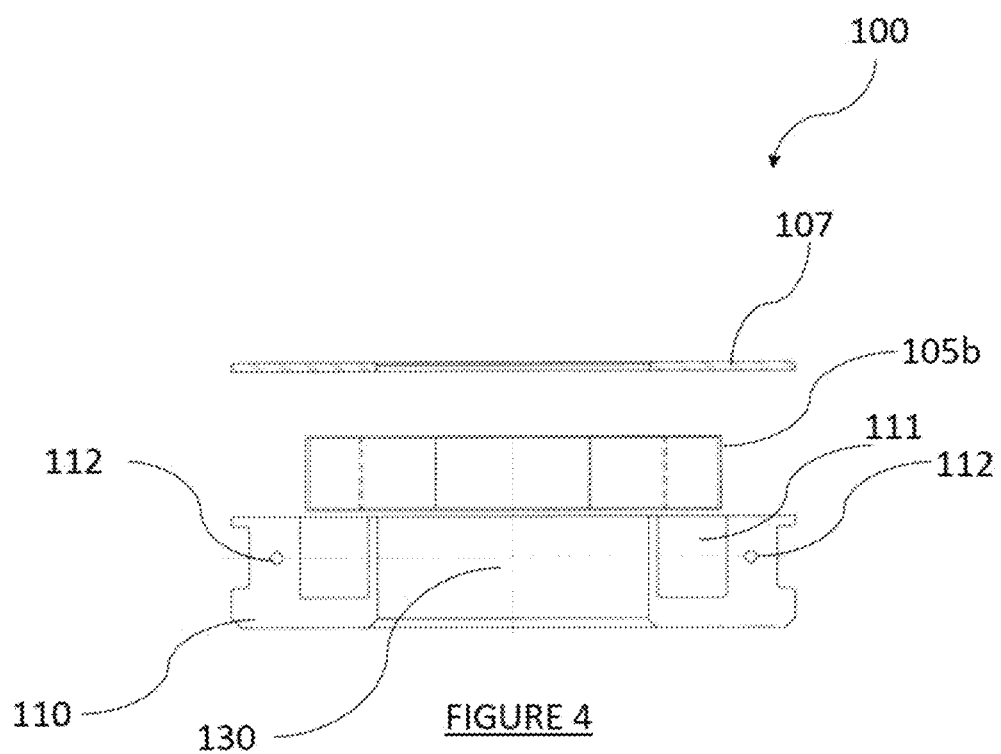
FIG. 4 is an elevation on section B-B of the apparatus shown in FIG. 2.

Reference is now made to FIGS. 2, 3 and 4, which show a second embodiment of the invention. The apparatus 100 has many important similarities with the apparatus 1, both in relation to its principal components and its function.

The fluid treatment apparatus 1 comprises two ferrite ring halves 105a, and 105b. The apparatus 100 also comprises a driver winding 103 (which is connected to a driver unit (not shown)), and a resonant circuit winding 104 (which is connected to a capacitor (not shown)), both of which are provided around the ferrite ring half 105a.

Each ferrite ring half 105a and 105b is provided with a respective housing 110. Each housing comprises a curved channel 111, which is arranged to removably receive a respective ferrite ring half. With reference to FIG. 3, which is taken on section A-A, the parts of the ferrite halves are shown out of the respective channels 111, and located inside said channels.

The two housing parts 110 are separable and can be connected together by way of introducing two fasteners, such as a screw or similar, through bores 112 which are provided adjacent to the mating faces of said housing parts. This allows the housing parts to be connected tightly together to form a single entity (and in so doing minimising any gap between opposing end faces of the ferrite rig halves 105a and 105b). In such a connected condition a cover 107 can be attached over each of the channels 111, and retain the ferrite ring halves in position.

The feature referenced 120 is a gland that holds the power injection cable (such as a two-core cable), that runs between 3a and 3b.

The above described embodiments can advantageously be utilised for a wide array of applications. In relation to resisting the proliferation of bacterial growth, pools and spas, beer lines, cooling towers, dairies, sea water cooling systems, or any other fluid containing piping system where bio-fouling occurs in fluid-containing systems.

A further advantage of the embodiments is that since the oscillator circuit, the driver assembly and the ferrite assembly can be packaged to small dimensions which allows application to small conduits and/or in confined space. For example, the embodiments may be used in conjunction with medical catheters to prevent/reduce biofouling. The embodiments may also be used in relation to beer lines (for carrying beer (or similar)) from a supply to a point at which it can be dispensed, and to thereby prevent/reduce biofouling in the lines.

The invention claimed is:

1. A fluid treatment apparatus, the apparatus comprising:
    a ferrite assembly, arranged in use to be capable of surrounding a conduit containing fluid to be acted on,
    a driver, arranged to generate a pulsed current to which the ferrite assembly is subjected whereby the driver is electromagnetically coupled to the ferrite assembly by way of a driver winding around the ferrite assembly, and
    an oscillator circuit, which oscillator circuit is electromagnetically coupled to the ferrite assembly by way of an oscillator circuit winding around the ferrite assembly, and which in response to the pulsed current generated by the driver, causes an oscillating signal to be generated which gives rise to an electromagnetic field which acts on the fluid in the conduit, and wherein the driver winding and the oscillator circuit winding are electrically separated.

2. The fluid treatment apparatus of claim 1, wherein the oscillator circuit is arranged to generate a decaying oscillating signal.

3. The fluid treatment apparatus of claim 2, wherein the driver is arranged to produce a subsequent pulse when the decaying oscillating signal has fully or substantially fully decayed or dissipated.

4. The fluid treatment apparatus of claim 1, wherein the oscillator circuit is arranged to be energised as a result of the pulsed current that is generated by the driver, and the oscillator circuit is arranged to generate an alternating electromagnetic field which is applied to fluid in the conduit.

5. The fluid treatment apparatus of claim 4, wherein the oscillator circuit is a passive circuit, responsive to the pulse generated by the driver.

6. The fluid treatment apparatus of claim 4, wherein the oscillator circuit comprises a capacitor and a number of turns of winding around the ferrite assembly.

7. The fluid treatment apparatus of claim 4, wherein the ferrite assembly is comprised of two or more parts arranged to adopt a detached condition and a connected condition wherein the two or more parts are connected together and wherein the ferrite assembly may be reconfigured from the connected condition to a detached condition wherein the two or more parts of the ferrite assembly are disconnected from one another.

8. The fluid treatment apparatus of claim 7, wherein, in the detached condition, at least two end regions of the ferrite assembly are detached and separated from each other, and in the connected condition the at least two end regions are held together.

9. The fluid treatment apparatus of claim 4, wherein at least two end regions of the ferrite assembly are detachably connectable.

10. The fluid treatment apparatus of claim 7, wherein, when the ferrite assembly is in the connected condition, the at least two end regions are arranged such as to form an interface which substantially ensures electromagnetic continuity.

11. The fluid treatment apparatus of claim 7, wherein, in the connected condition, the ferrite assembly defines an internal space through which the conduit is able to pass.

12. The fluid treatment apparatus of claim 7, further comprising a fastener arrangement to maintain the ferrite assembly in the connected condition.

13. The fluid treatment apparatus of claim 7, wherein the ferrite assembly is arranged to be separable into two ferrite component parts.

* * * * *